United States Patent
Kim et al.

(10) Patent No.: US 12,203,673 B2
(45) Date of Patent: Jan. 21, 2025

(54) AIR VENTILATION APPARATUS USING COANDA EFFECT AND AIR VENTILATION METHOD USING COANDA EFFECT

(71) Applicants: HYUNDAI MOBIS Co., Ltd., Seoul (KR); ITW EF&C Korea LLC., Incheon (KR)

(72) Inventors: Seung Cheol Kim, Yongin-si (KR); Byung Jo Kim, Incheon (KR)

(73) Assignees: HYUNDAI MOBIS Co., Ltd., Seoul (KR); ITW EF&C Korea LLC., Incheon (KR)

( * ) Notice: Subject to any disclaimer, the term of this patent is extended or adjusted under 35 U.S.C. 154(b) by 506 days.

(21) Appl. No.: 17/086,060

(22) Filed: Oct. 30, 2020

(65) Prior Publication Data

US 2021/0131697 A1    May 6, 2021

(30) Foreign Application Priority Data

Nov. 1, 2019 (KR) ........................ 10-2019-0138638

(51) Int. Cl.
*F24F 13/06* (2006.01)
*F24F 13/08* (2006.01)

(52) U.S. Cl.
CPC ............ *F24F 13/06* (2013.01); *F24F 13/081* (2013.01); *F24F 2221/28* (2013.01)

(58) Field of Classification Search
CPC ...... F24F 13/06; F24F 13/081; F24F 2221/28; B60H 1/00871; B60H 1/34; B60H 1/3457;

(Continued)

(56) References Cited

U.S. PATENT DOCUMENTS

2014/0357179 A1* 12/2014 Londiche ............... C22C 38/04
  454/322
2016/0288625 A1* 10/2016 Uhlenbusch ............ F24F 13/14
(Continued)

FOREIGN PATENT DOCUMENTS

CN         107206868 A       9/2017
FR       2886382 A1 * 12/2006    ........... B60H 1/3414
(Continued)

OTHER PUBLICATIONS

Federnandes, Lionel, FR2886382 Translation.pdf, "Motor vehicle air vent", Dec. 2006, pp. 1-7.*

*Primary Examiner* — Avinash A Savani
*Assistant Examiner* — Ryan L Faulkner
(74) *Attorney, Agent, or Firm* — Morgan, Lewis & Bockius LLP

(57) ABSTRACT

In the present invention, a wind direction is not directly changed using a wind direction adjusting wing and a guide related thereto, but the wind direction is changed due to the Coanda effect and the vortex formation. A basic principle of the present invention of adjusting a wind direction by applying a Coanda effect is to design the air ventilation apparatus such that a wind direction is adjusted upward or downward by causing a Coanda effect on one curved surface of the air ventilation apparatus connected to a skin surface of a dashboard garnish and preventing the Coanda effect from being caused on an opposite surface. In addition to the Coanda effect, a structure for artificially forming a vortex is added to the air ventilation apparatus to maximize the Coanda effect.

10 Claims, 15 Drawing Sheets

(58) Field of Classification Search
CPC .. B60H 1/3414; B60H 1/345; B60H 1/00671;
B60H 1/00685
USPC ........................................................ 454/248
See application file for complete search history.

(56) References Cited

U.S. PATENT DOCUMENTS

2019/0315200 A1* 10/2019 Pestke .................. B60H 1/3421
2019/0329630 A1* 10/2019 Ren ...................... B60H 1/3414

FOREIGN PATENT DOCUMENTS

JP          2017-65348 A    4/2017
KR          10-1950311 B1   2/2019

* cited by examiner (A)

(B)

(A)

(B)

(A)

(B)

(A)

(B)

(A)

(B)

(A)

(B)

(A)

(B)

AIR VENTILATION APPARATUS USING COANDA EFFECT AND AIR VENTILATION METHOD USING COANDA EFFECT

CROSS-REFERENCE TO RELATED APPLICATION

This application claims priority to and the benefit of Korean Patent Application No. 10-2019-0138638, filed on Nov. 1, 2019, the disclosure of which is incorporated herein by reference in its entirety.

BACKGROUND

1. Field of the Invention

The present invention relates to a wind direction adjustable air ventilation apparatus, and more particularly, to an air ventilation apparatus and method using Coanda effect and vortex formation.

2. Discussion of Related Art

A wind direction adjustable air ventilation apparatus is disposed in a vehicle cockpit, and in order to adjust the wind direction, a user changes the wind direction and opens or closes an outlet manually with wind direction adjusting wings exposed from a dashboard or using a mechanical means.

An air ventilation apparatus not only performs an original function related to an air circulation in a vehicle but also plays a big role in a design of a cockpit in itself. In particular, according to the recent design trend of the cockpit, the demand for an ultra-slim air ventilation apparatus, which includes a wind outlet having a height (vertical width) of 15 mm or less, is increasing. However, when a vertical width of the wind outlet is less than 15 mm, the conventional vertical wind direction adjusting wing structure is difficult to apply without any change due to a narrow mechanical dimension. In addition, since the air pressure of the outlet for air ventilation is increased, there arise problems in implementing an ultra-slim air ventilation apparatus required for a next generation air ventilation apparatus.

SUMMARY OF THE INVENTION

The present invention is directed to providing an air ventilation apparatus capable of naturally adjusting a discharge wind direction of air ventilation by applying a different method from a conventional vertical wind direction adjusting wing in order to solve problems due to an outlet for air ventilation being made ultra-slim, and an air ventilation method.

In order to solve the above problem, a wind direction is adjusted by applying a Coanda effect. The Coanda effect is discovered by Romanian Henri Coanda, which refers to a phenomenon in which a fluid jet ejected adjacent to a portion of a surface is attracted to the surface to flow. The effect is caused by viscosity of a fluid. Adjusting a wind direction of an outlet by applying the Coanda effect, a vertical wind direction adjusting wing can be replaced and a structure due to the outlet being made ultra-slim (to have a vertical width of 15 mm or less) can be simplified.

A basic principle of the present invention for adjusting a wind direction by applying a Coanda effect is to design an air ventilation apparatus such that a wind direction is adjusted upward or downward by causing a Coanda effect on one curved surface of the air ventilation apparatus connected to a skin surface of a dashboard garnish and preventing the Coanda effect from being caused on an opposite surface. Furthermore, in addition to the Coanda effect, a structure for artificially forming a vortex is added to the air ventilation apparatus to maximize the Coanda effect. That is, in the method of adjusting a wind direction of the present invention, a wind direction is not directly changed using a wind direction adjusting wing and a guide related thereto, but the wind direction is changed due to the Coanda effect and the vortex formation.

According to an aspect of the present invention, there is provided an air ventilation apparatus, which is positioned between an upper garnish and a lower garnish and includes an outlet for discharging air and operates in an upward mode and a downward mode, including an upper air guide which converts air discharged from the outlet into an upward wind due to a Coanda effect caused along the upper garnish in the upward mode, and a lower air guide which converts the air discharged from the outlet into a downward wind due to the Coanda effect caused along the lower garnish in the downward mode.

The upper air guide may include an end surface which retracts from the outlet in the upward mode to allow the air discharged from the outlet to be discharged as the upward wind due to the Coanda effect caused along the upper garnish. In addition, the end surface of the upper air guide may enter the outlet in the downward mode to suppress the air discharged from the outlet from causing the Coanda effect along the upper garnish.

The lower air guide may include an end surface which retracts from the outlet in the downward mode to allow the air discharged from the outlet to be discharged as the downward wind due to the Coanda effect caused along the lower garnish. In addition, the end surface of the lower air guide may enter the outlet in the upward mode to suppress the air discharged from the outlet from causing the Coanda effect along the lower garnish.

In addition, the air ventilation apparatus may further include an upper vortex generator configured to generate a vortex between the outlet and the upper air guide so as to join the upward wind due to the Coanda effect, and a lower vortex generator configured to generate a vortex between the outlet and the lower air guide so as to join the downward wind due to the Coanda effect.

According to another aspect of the present invention, it is possible to form an upward or downward wind due to a Coanda effect using a single air guide instead of the upper and lower air guides. To this end, an air ventilation apparatus includes an air guide which converts air discharged from an outlet into an upward wind due to a Coanda effect caused along an upper garnish in an upward mode and converts the air discharged from the outlet into a downward wind due to the Coanda effect caused along a lower garnish in a downward mode.

According to still another aspect of the present invention, an air ventilation method using a Coanda effect includes converting air discharged from an outlet into an upward wind due to the Coanda effect caused along an upper garnish in an upward mode and converting the air discharged from the outlet into a downward wind due to the Coanda effect caused along a lower garnish in a downward mode.

The idea of the present invention introduced above will become more apparent through specific embodiments described with reference to the drawings.

DETAILED DESCRIPTION OF EXEMPLARY EMBODIMENTS

Figure 1:
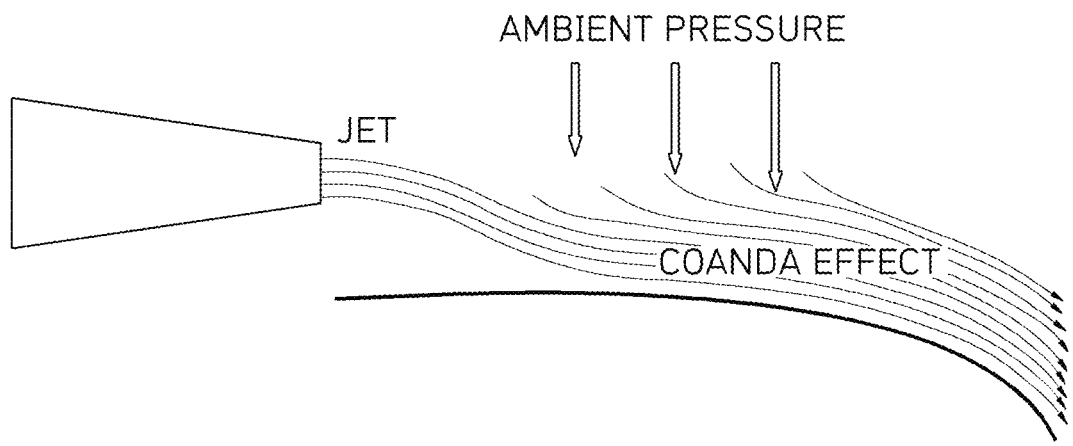
FIG. 1 is a schematic view for explanation of a Coanda effect.

The advantages and features of the present invention and methods for accomplishing the same will be more clearly understood from embodiments to be described in detail below with reference to the accompanying drawings. However, the present invention is not limited to the following embodiments but may be implemented in various different forms. Rather, these embodiments are provided to only complete the disclosure of the present invention and to allow those skilled in the art to understand the category of the present invention. The present invention is defined by the category of the claims. Meanwhile, terms used in this specification are to describe the embodiments and are not intended to limit the present invention. As used herein, singular expressions, unless defined otherwise in contexts, include plural expressions. It will be further understood that the terms "comprises," "comprising," "includes," and/or "including," if used herein, specify the presence of stated components, steps, operations, and/or elements, but do not preclude the presence or addition of one or more other components, steps, operations, and/or elements.

Hereinafter, exemplary embodiments of the present invention will be described in detail with reference to the accompanying drawings. In adding reference numerals for elements in each drawing, it should be noted that like reference numerals already used to denote like elements in other drawings are used for elements wherever possible. Moreover, in describing the present invention, detailed descriptions related to well-known functions or configurations will be ruled out in order not to unnecessarily obscure subject matters of the present invention.

FIG. 1 is a schematic view for explanation of a Coanda effect. The Coanda effect refers to a phenomenon in which a fluid flows being attracted to a curved surface. In FIG. 1, it can be seen that when a fluid jet is ejected from an exit, the fluid jet flows along a surface adjacent to a nozzle under the influence of ambient pressure.

Figure 2A:
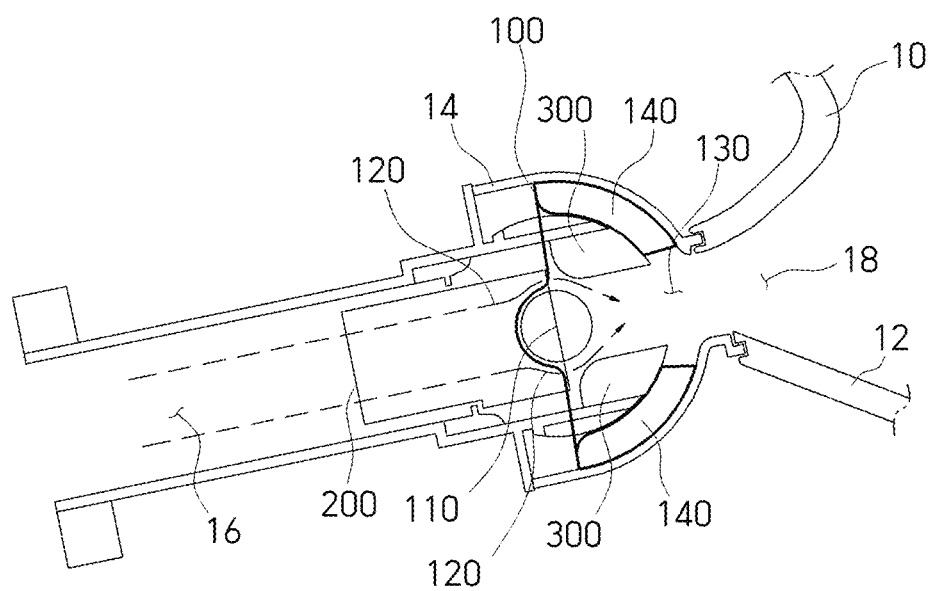
FIG. 2A is a view illustrating a configuration of an air ventilation apparatus according to a first embodiment of the present invention.

FIG. 2A is a view illustrating a configuration of an air ventilation apparatus according to a first embodiment of the present invention, which is a cross-sectional view taken vertically along a length thereof.

An air vent housing 14 is installed in an interior space formed by an upper garnish 10 and a lower garnish 12 of a dashboard. The air vent housing 14 is designed such that air introduced through an air inlet 16 exits through an outlet 18. The outlet 18 is open to an interior of a car. An air duct 200 configured to guide the air is disposed at a middle portion of the air vent housing 14.

In the air vent housing 14, an air guide cover 100 is also positioned adjacent to the outlet 18.

Figure 2B:
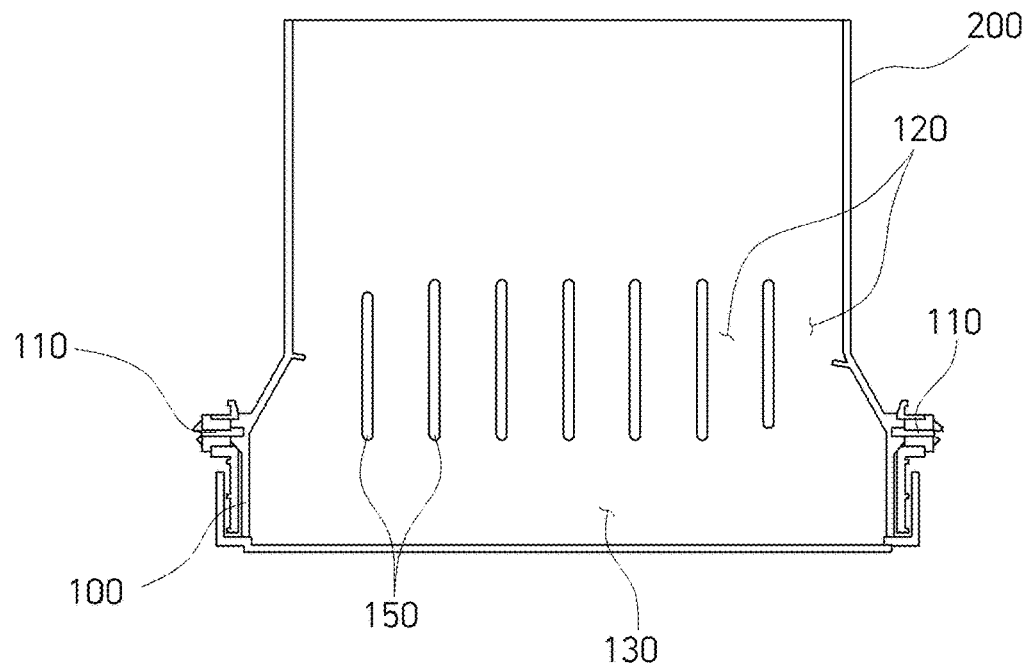
FIG. 2B is a cross-sectional view of an air guide cover (100).

FIG. 2B is a cross-sectional view of the air guide cover 100 taken horizontally. The air guide cover 100 is tilted upward and downward by a hinge shaft 110 in the air vent housing 14 to adjust a wind direction upward and downward and to discharge air through the outlet 18.

Referring to FIGS. 2A and 2B, the air guide cover 100 includes an inlet port 120 through which air introduced through the air inlet 16 is introduced via an air duct 200 and an outlet port 130 through which the introduced air exits. Air guides 140 are formed on inner upper and lower surfaces of the air guide cover 100. A plurality of left and right wind direction adjusting plates 150 are provided in the air guide cover 100. The upper and lower air guides 140 cause a Coanda effect along walls of the upper and lower garnishes and serve to allow air to flow upward or downward and to be discharged through the outlet 18. The left and right wind direction adjusting plates 150, like conventional wind direction adjusting plates, serve to adjust a direction of a wind discharged from the outlet 18 laterally or serve to open or close the outlet 18.

Meanwhile, the air vent housing 14 is provided with a vortex generator 300 which is attached in the air vent housing 14 or integrally formed with the air vent housing 14. As shown in FIG. 2A, the vortex generator 300 is a part fixed in the housing regardless of the tilting of the air guide cover 100. The vortex generator 300 interacts with the air guide 140 of the air guide cover 100 to create a vortex in air exiting from the outlet port 130 and the outlet 18 due to a Coanda effect.

Figure 3:
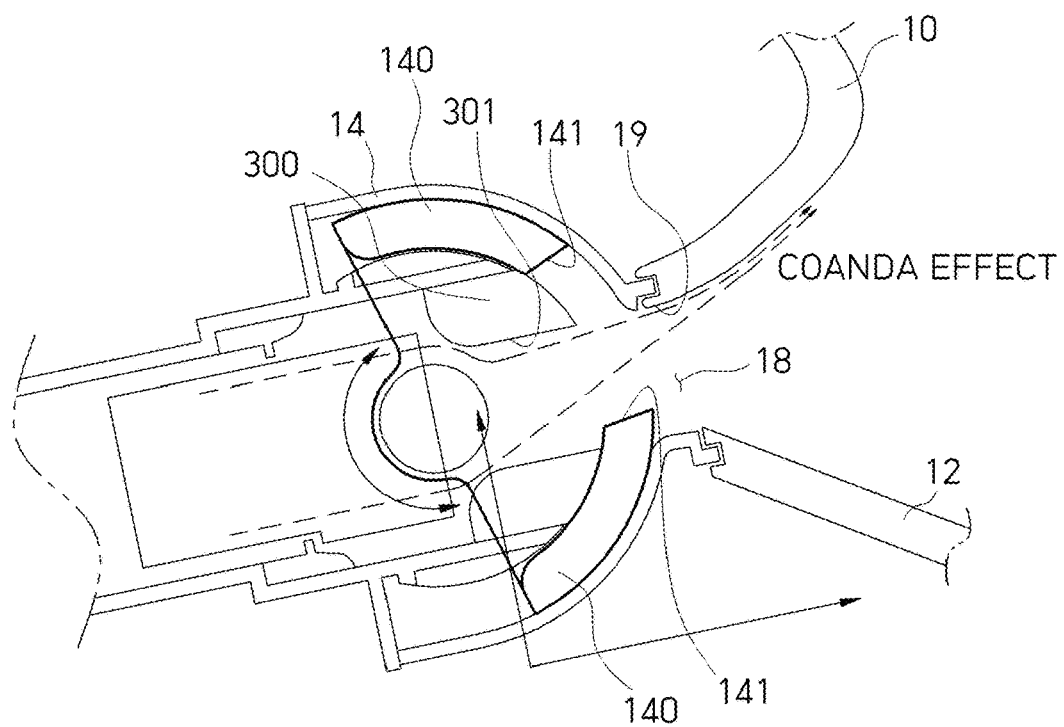
FIG. 3 is a detailed view for describing a Coanda effect due to an air guide (140).

FIG. 3 is a detailed view for describing a Coanda effect due to the air guide 140. Describing an operating structure of the air guide 140 of the air ventilation apparatus according to the present embodiment, the air guide cover 100 is rotated (tilted) upward or downward about the hinge shaft 110 to adjust a wind direction upward or downward. The air guides 140 are applied to upper and lower portions inside the air guide cover 100, wherein the air guide 140 at one side forms a Coanda effect and the air guide 140 at the other side removes the Coanda effect so as to adjust a wind direction upward or downward. Since the Coanda effect is used, the structure of the air guide cover 100 is simplified, and a conventional RR wing structure (not shown) in the outlet 18 for air ventilation is eliminated. Accordingly, the outlet 18 for air ventilation may be made ultra-slim (to have a vertical width of 15 mm or less), and an exterior design may be improved.

Referring to FIG. 3, the air guide cover 100 is rotated upward and accordingly, an end surface 141 of the upper air guide 140 moves away from an edge portion 19 in contact with the upper garnish 10 of the outlet 18 for air ventilation and retreats into the air vent housing 14. Accordingly, when air introduced through the inlet port 120 of the air guide cover 100 exits the outlet port 130, the air exits the outlet 18 without being caught and is discharged as an upward wind along the wall of the upper garnish 10 due to a Coanda effect.

On the other hand, an end surface 141 of the lower air guide 140 moves out of the air vent housing 14 from an edge portion 19 in contact with the lower garnish 12 of the outlet 18 for air ventilation and enters into the outlet 18. Accordingly, when the air introduced through the inlet port 120 of the air guide cover 100 exits the outlet port 130, the air is blocked by the lower garnish 12 and its direction is changed towards the upper garnish 10, and the air joins the air discharged, due to Coanda effect, along the wall of the upper garnish 10. As a result, air is discharged upward through the outlet 18 as a whole.

It has been described in FIG. 3 that only an upward wind direction is obtained due to a Coanda effect due to the upper garnish 10, but on the contrary, a mechanism for obtaining a downward wind direction due to a Coanda effect by the lower garnish 12 is the same as that of the upward wind direction.

Figure 4:
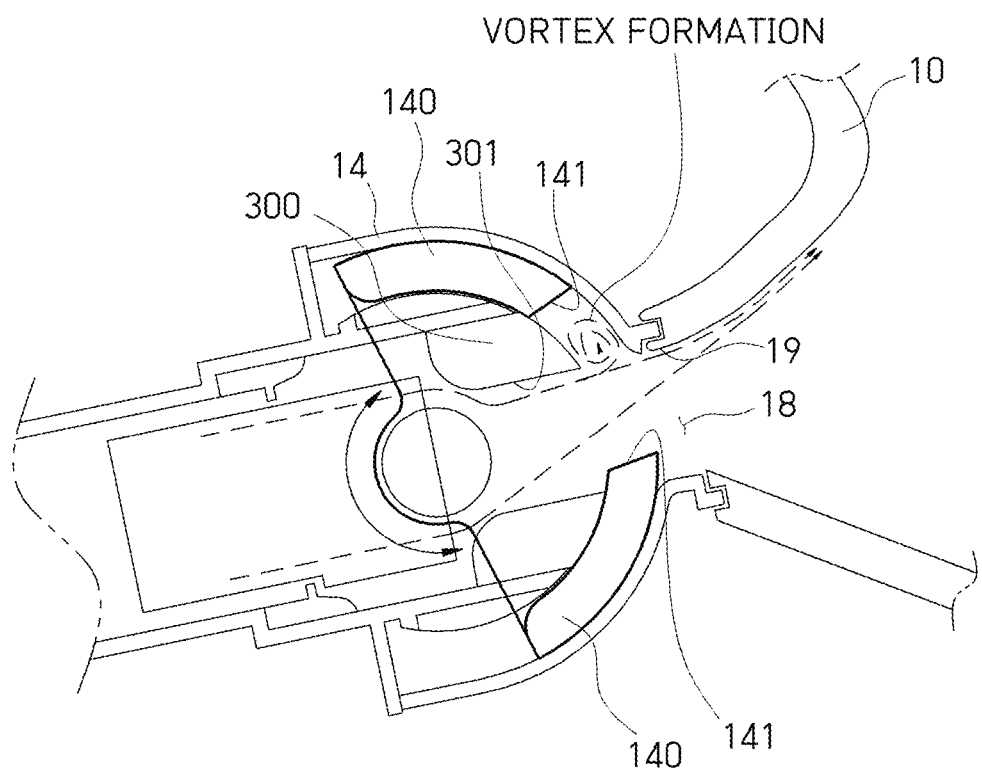
FIG. 4 is a view for describing an operation in which a vortex is formed by a vortex generator (300).

FIG. 4 is view for describing an operation in which a vortex is formed by the vortex generator 300 in addition to the above-described Coanda effect.

The vortex generator 300 is provided adjacent to the outlet 18 in the air vent housing 14 so as to be fixed regardless of vertical rotation of the air guide 140. The vortex generator 300 has an inner surface 301 which is positioned approximately coplanar with the edge portion 19 of the outlet 18 and faces an inner surface of a passage through which air passes. As shown in FIG. 4, when the air guide cover 100 is rotated upward, the end surface 141 of the air guide 140 moves away from the edge portion 19 and enters the air vent housing 14. In this case, the inner surface 301 of the vortex generator 300 is positioned approximately coplanar with the edge portion 19 of the outlet 18, and thus, a space is formed between the vortex generator 300 and the edge portion 19. A vortex is generated in the space. That is, when air, which exits the outlet port 130 of the air guide cover 100 to exit through the outlet 18 of the air vent housing 14, turns its course along the upper garnish 10 due to a Coanda effect, the air causes the vortex in the space. Due to the vortex, a speed of upward air exiting the outlet 18 is increased, and the Coanda effect is maximized On the contrary, the end surface 141 of the air guide 140 at a lower side moves out toward the outlet 18 and blocks the inner surface 301 of the vortex generator 300 and the edge portion 19. Thus, like the above-described Coanda effect removal, a direction of air is changed upward, and there is no room for vortex generation.

Figure 5A:
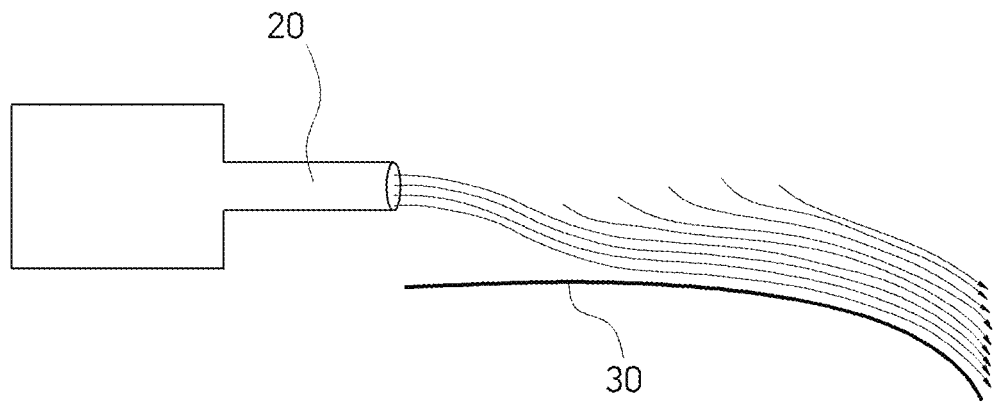
FIGS. 5A and 5B illustrate views for describing a principle in which a vortex is formed by the vortex generator (300) to maximize a Coanda effect.
Figure 5B:
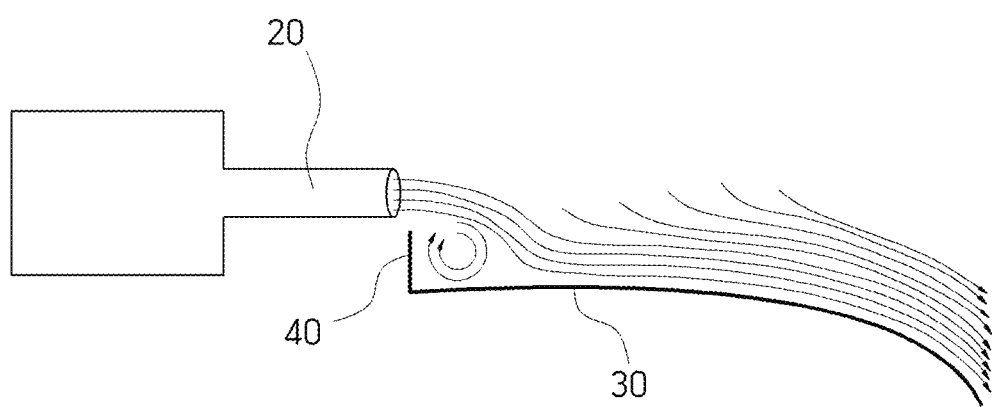

FIGS. 5A and 5B illustrate views for describing a principle in which a vortex is formed by the vortex generator 300 to maximize a Coanda effect. As shown in FIG. 5A, a flow discharged from a fluid outlet 20 causes a Coanda effect by an adjacent wall 30. As shown in FIG. 5B, when a stepped portion 40 is present at the starting position of the wall 30 as soon as the flow exits the fluid outlet 20, a vortex is formed at a portion at which the flow is covered by the stepped portion 40. The Coanda effect is maximized by the vortex.

Figure 6A:
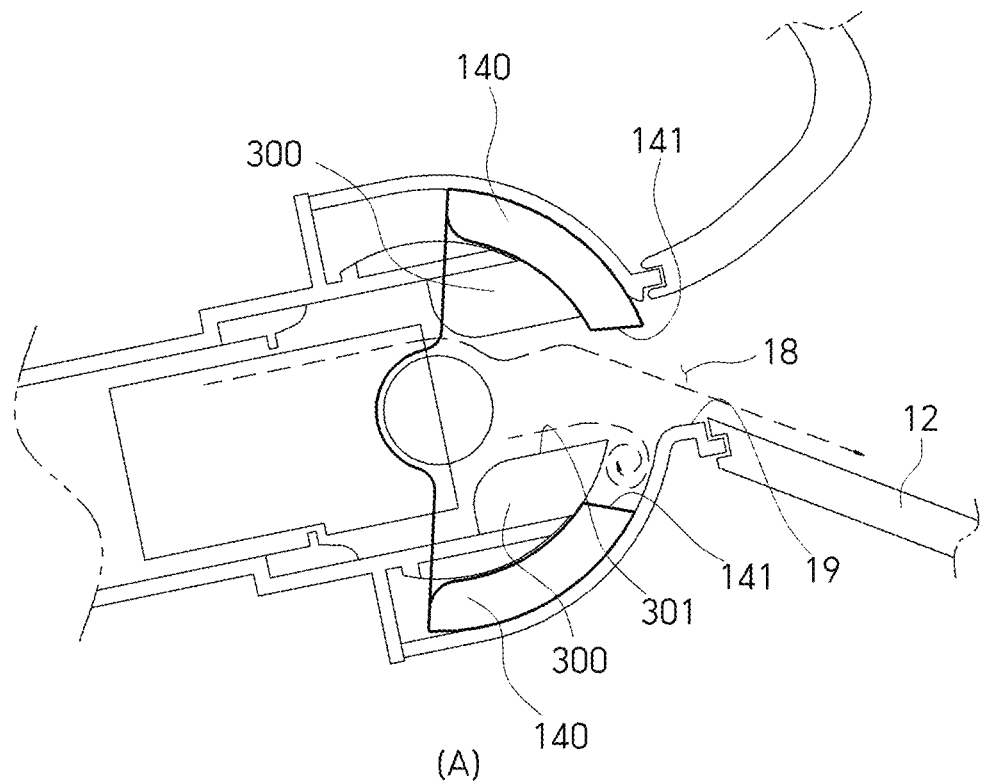
FIGS. 6A, 6B, and 6C are views for describing a Coanda effect and an action of a vortex according to operation modes.
Figure 6A:
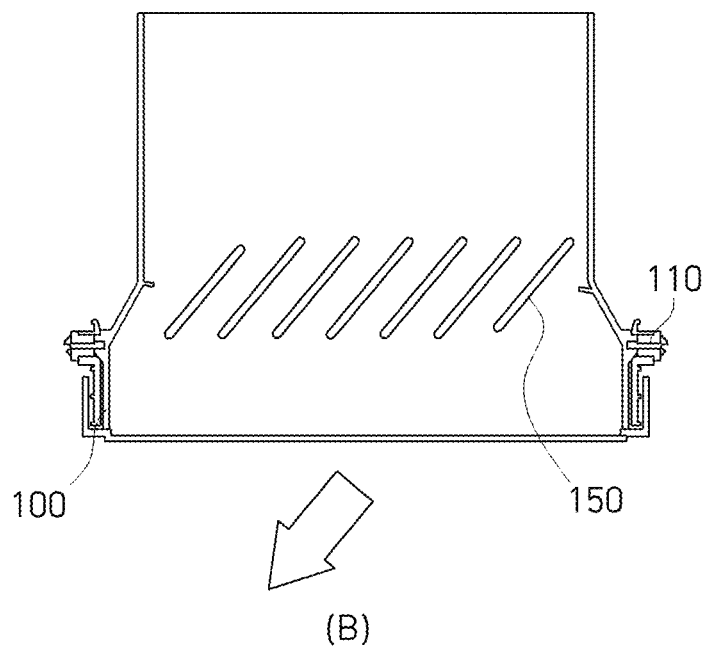
Figure 6B:
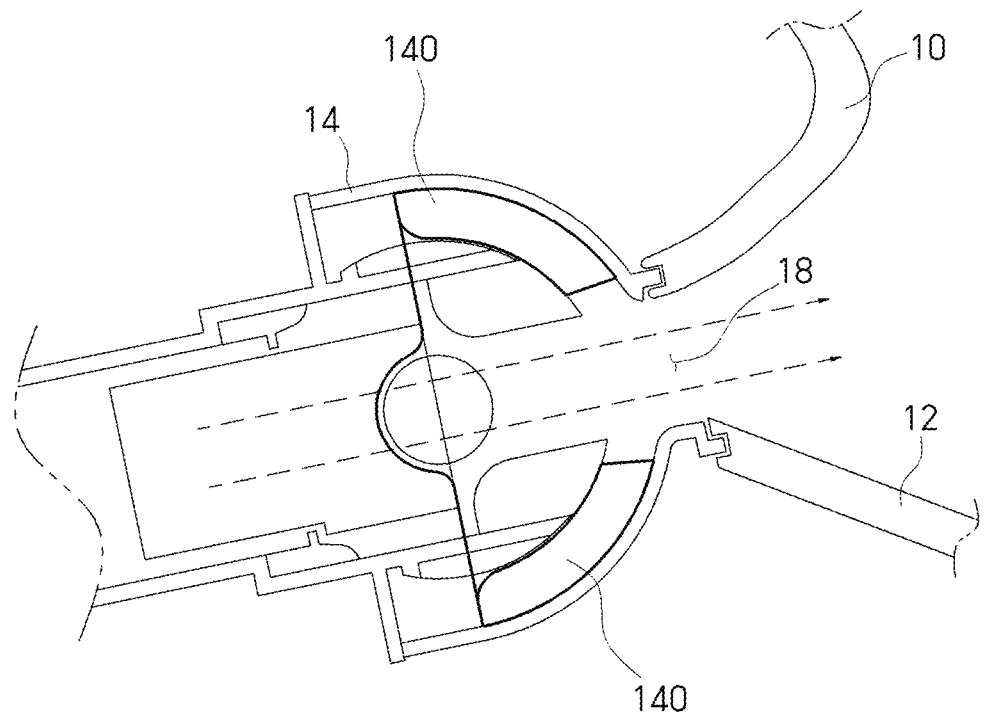
Figure 6B:
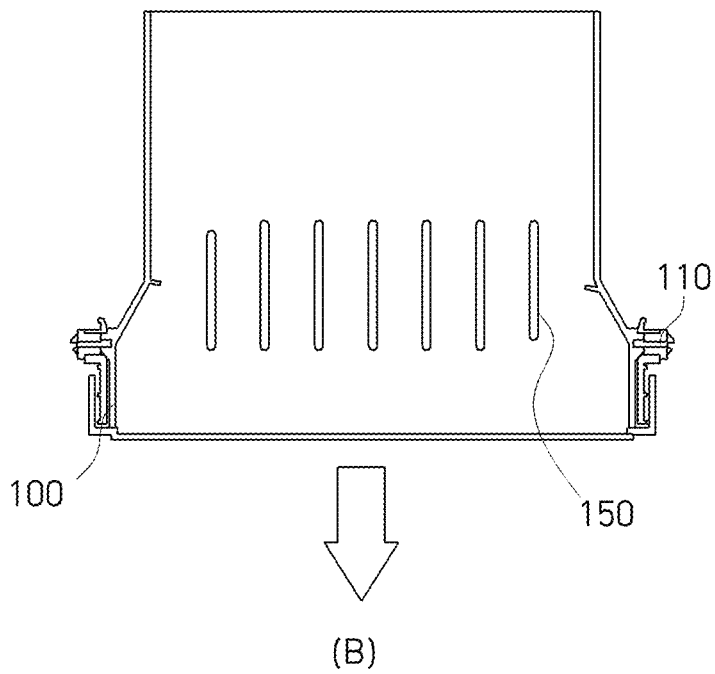
Figure 6C:
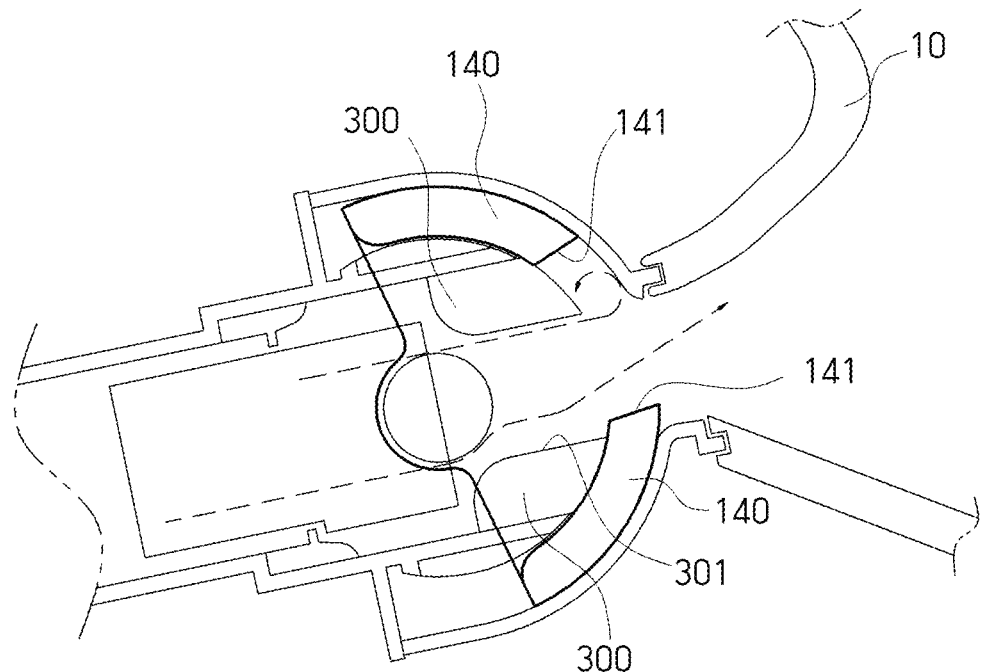
Figure 6C:
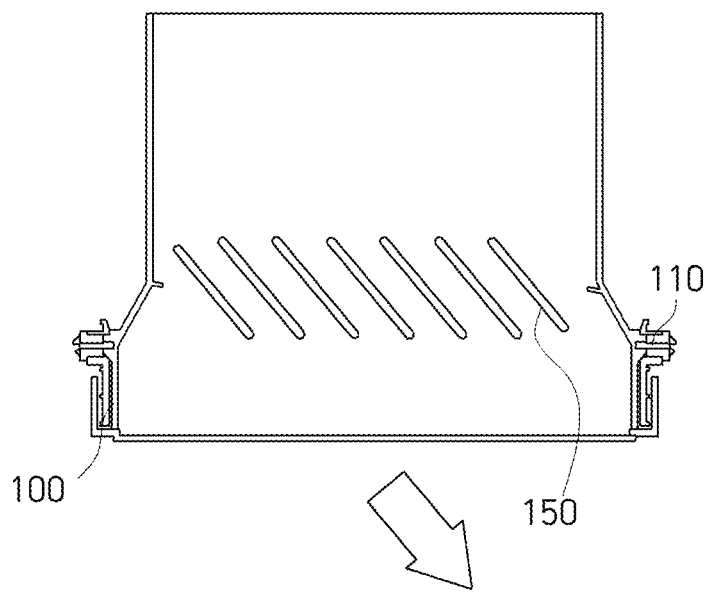

FIGS. 6A, 6B, and 6C are views for describing a Coanda effect and an action of a vortex according to operation modes, such as downward, upward, and normal mode; leftward, normal, and rightward mode, according to the present embodiment. Upper drawings of FIGS. 6A, 6B, and 6C illustrate the downward, normal, and upward modes, and lower drawings thereof illustrate the leftward, normal, and rightward modes.

In the downward mode of FIG. 6A, a mechanism in which a Coanda effect is caused along the lower garnish 12 and a vortex is generated in a space between the lower edge portion 19 of the outlet 18 and the end surface 141 of the lower air guide 140 retracted into the air vent housing 14 is the same as a mechanism of the upward mode described with reference to FIG. 3 except that a direction thereof is opposite to that of the mechanism of the upward mode. In the normal mode of FIG. 6B, the air guide cover 100 is positioned at a complete center of the air vent housing 14, and the end surfaces 141 of the upper and lower air guides 140 do not protrude further than the upper and lower edge portions 19 of the outlet 18, and thus, wind is discharged centrally toward the front of the outlet 18. In the upward mode of FIG. 6C, a mechanism in which a Coanda effect is caused along the upper garnish 10 and a vortex is formed in a space between the upper edge portion 19 of the outlet 18 and the end surface 141 of the upper air guide 140 positioned to enter into the air vent housing 14 is the same as that described with reference to FIGS. 3 and 4.

On the other hand, the leftward, normal, and rightward modes shown in the lower drawings of FIGS. 6A, 6B, and 6C are performed by the left and right wind direction adjusting plates 150 in the air guide cover 100 as shown in FIG. 2B.

Figure 7A:
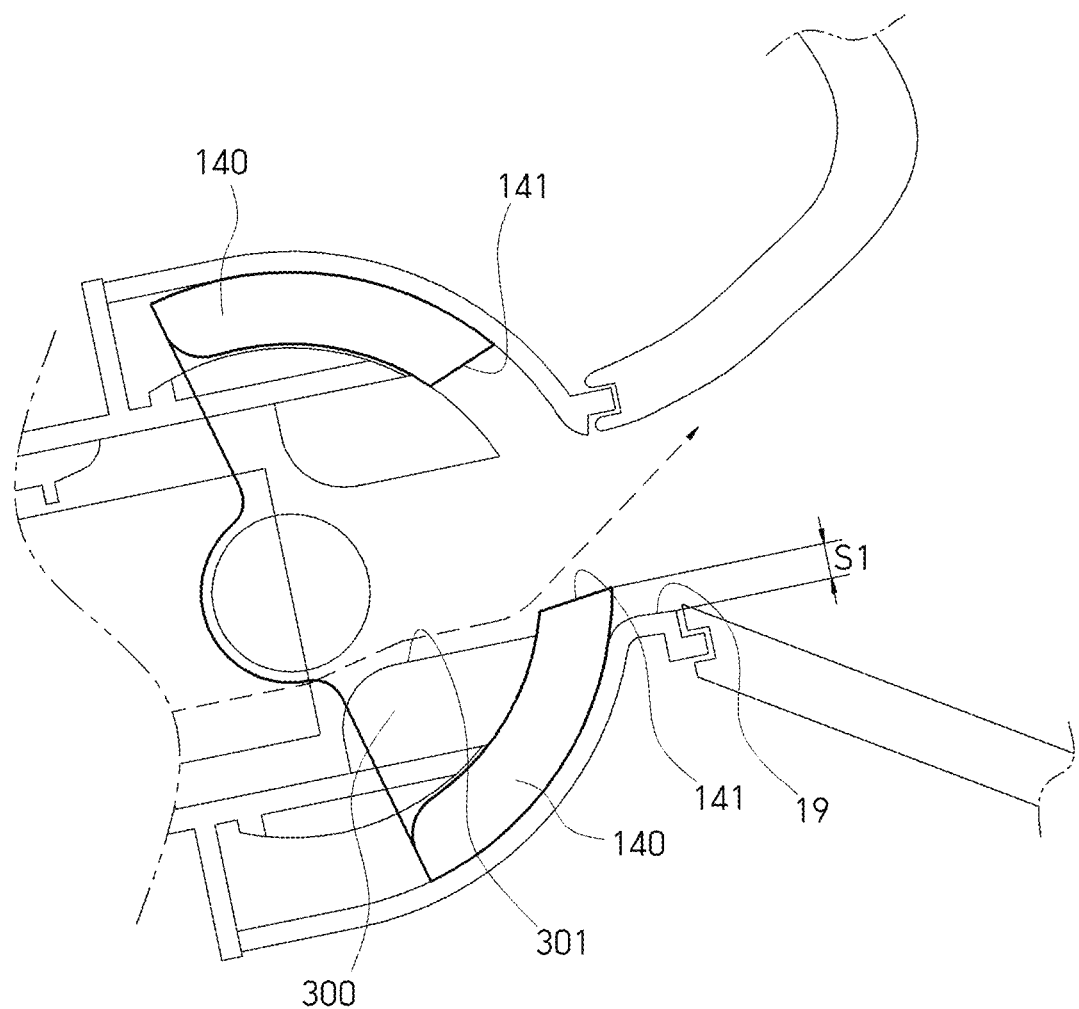
FIGS. 7A and 7B are views for describing a positional condition of an end surface 141 of the air guide (140).
Figure 7B:
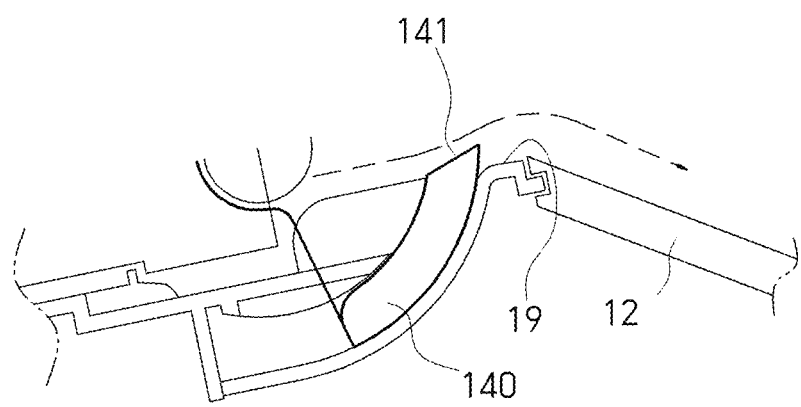
Figure 7B:
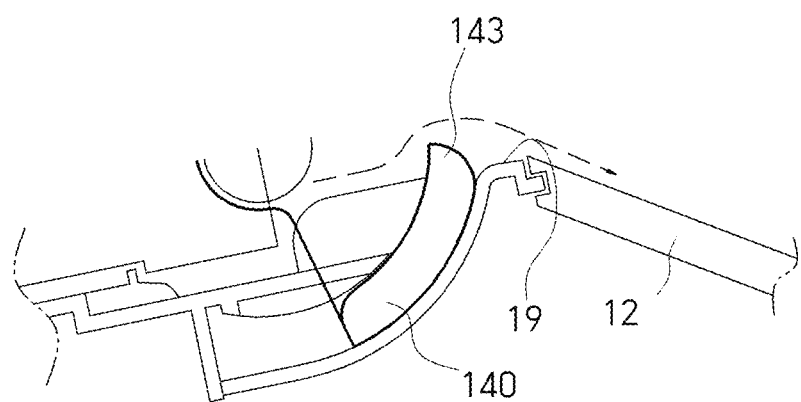

FIGS. 7A and 7B are views for describing a positional condition of the end surface 141 of the air guide 140 in the air ventilation apparatus according to the embodiment of the present invention to obtain a Coanda effect. FIG. 7A illustrates a desirable condition in which air exiting from the outlet 18 causes a Coanda effect along the upper garnish 10 to be discharged upward in an upward mode, and FIG. 7B illustrates two undesirable cases in which a Coanda effect may not be caused in an upward direction.

The reasons for air being discharged upward in the situation of FIG. 7A include a case that Coanda effect is caused along the upper garnish 10 and a case that the end surface 141 of the lower air guide 140 enters into the outlet 18 further than the lower edge portion 19 of the outlet 18 thereby a course of air being changed upward so that the air joins the air flowing upward. Therefore, in the upward mode, the end surface 141 of the lower air guide 140 should protrude into the outlet further than the edge portion 19 to form a stepped portion and to suppress a Coanda effect caused by the lower garnish 12. A height s1 (distance between the end surface 141 and the edge portion 19) of a stepped portion required to suppress the Coanda effect needs to be greater than 5 mm.

Therefore, as shown in an upper drawing of FIG. 7B, when the height s1 of the stepped portion is 5 mm or less, a Coanda effect may be caused along the lower garnish 12, which makes it difficult to adjust a wind direction upward. In addition, when a shape of an end surface 143 of the air guide 140 shown in a lower drawing of FIG. 7B cannot serve as a stepped portion, that is, when the air guide 140 has the round end surface 143 rather than the angular end surface 141 of FIG. 7A, a course of air may not be changed, and thus, a downward Coanda effect may not be suppressed.

Figure 8A:
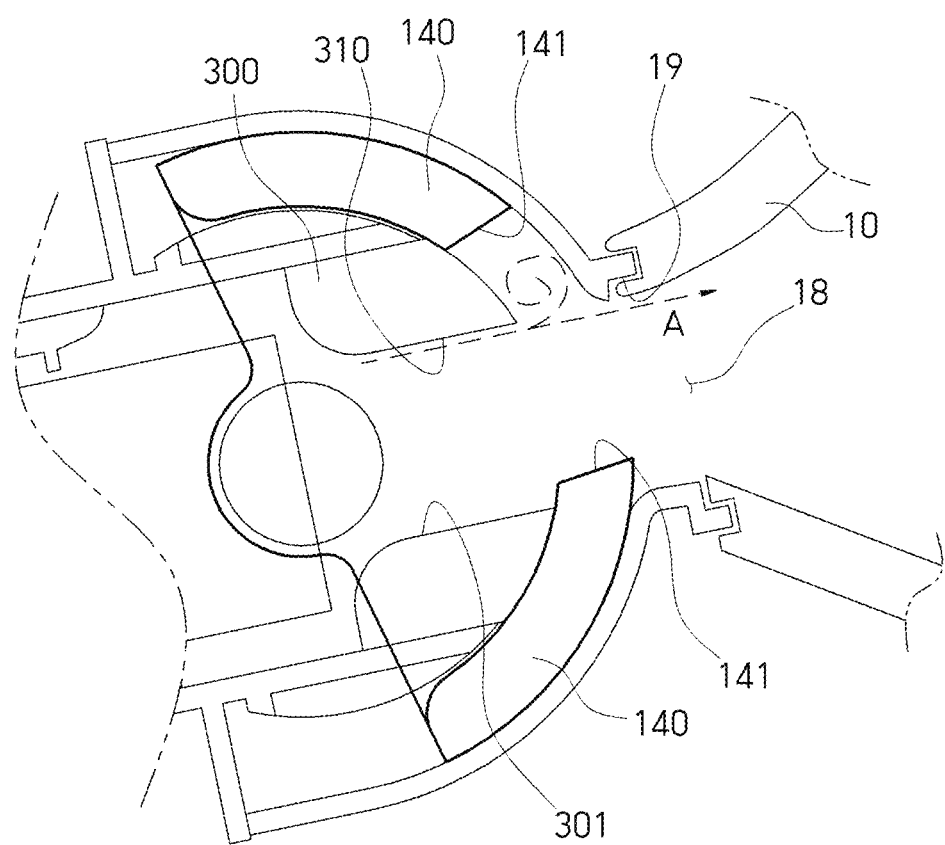
FIGS. 8A and 8B are views for describing a positional condition of the vortex generator (300).
Figure 8B:
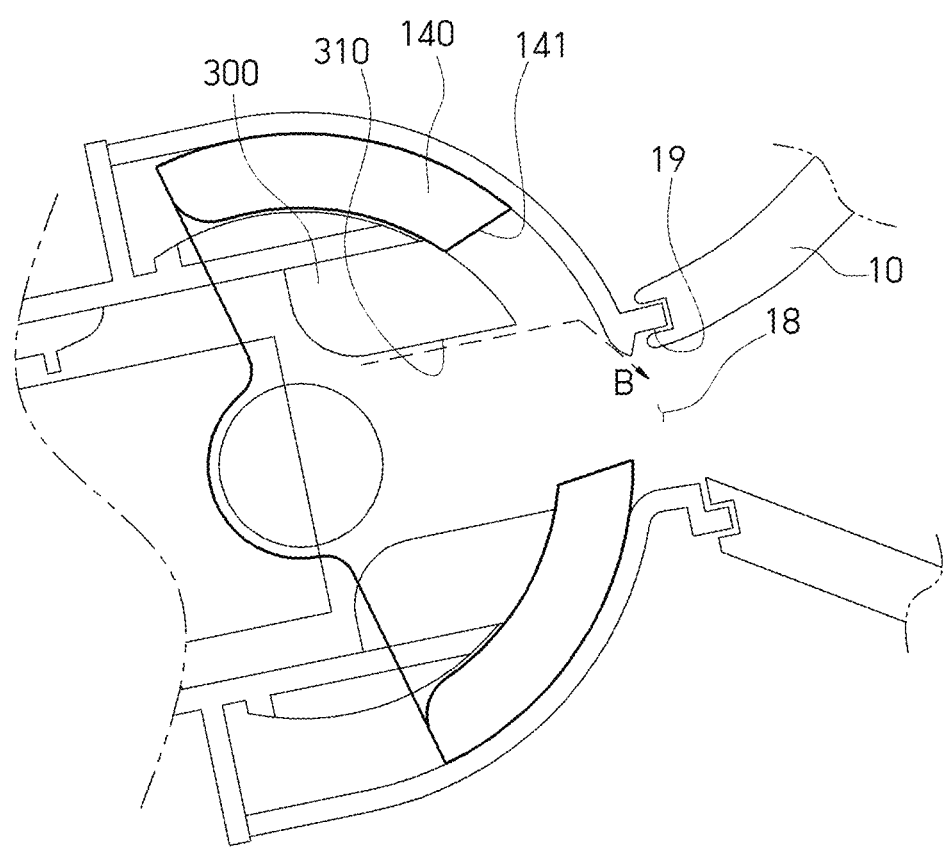

FIGS. 8A and 8B are views for describing a positional condition of the vortex generator 300 for forming a vortex in the air ventilation apparatus according to the embodiment of the present invention. FIG. 8A illustrates, in an upward mode a desirable condition in which a vortex is formed in addition to a condition in which air exiting from the outlet 18 causes a Coanda effect along the upper garnish 10 to be discharged upward, and FIG. 8B illustrates an undesirable situation in which a vortex may not be formed.

It has been described in FIG. 4 above that the vortex generator 300 is fixedly installed adjacent to the outlet 18 in the air vent housing 14 regardless of the vertical rotation of the air guide 140. The vortex generator 300 has the inner surface 301 which should be positioned approximately coplanar with the edge portion 19 of the outlet 18. In the upward mode of FIG. 8A, when air moves upward along the upper garnish 10 due to a Coanda effect, a vortex is generated in a space formed by the inner surface 301, the end surface 141 of the air guide 140, and the edge portion 19 of the outlet 18 (indicated by "A"). To this end (i.e., to generate a vortex in the space), the inner surface 301 of the vortex generator 300 should be positioned coplanar with the edge portion 19 of the outlet 18.

If, as in an example of FIG. 8B, the inner surface 301 of the vortex generator 300 is disposed at a lower level than the edge portion 19 of the outlet 18, the edge portion 19 serves as a stepped portion, the discharged air is bent at the edge portion 19, and thus, a vortex is not generated (indicated by "B" in FIG. 8B).

Figure 9:
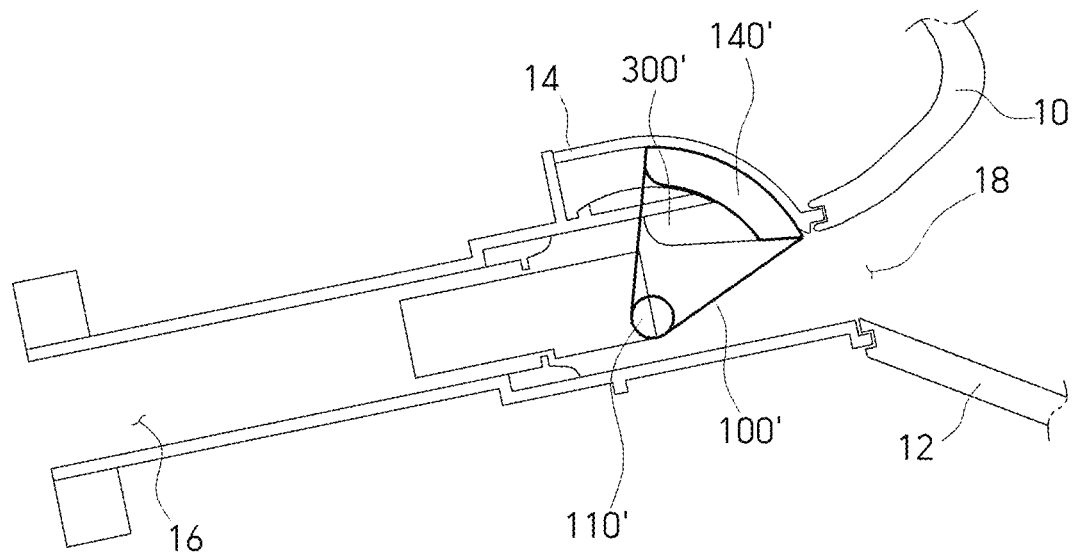
FIG. 9 is a view illustrating a configuration of an air ventilation apparatus according to a second embodiment of the present invention.

FIG. 9 is a cross-sectional view of a cover of an air guide 140 according to a second embodiment different from the above-described embodiment and is a view for describing a concept of this embodiment. Since a basic wind direction adjusting method is the same as that of the first embodiment, descriptions will be briefly given below.

The second embodiment is the same as the first embodiment in that an air vent housing 14 is installed in an interior space formed by an upper garnish 10 and a lower garnish 12, and in the air vent housing 14, air introduced through an air inlet 16 exits through an outlet 18. Like that shown in FIG. 2A, an air duct 200 configured to guide air is disposed at a middle portion of the air vent housing 14. However, the shape of an air guide cover 100', which is adjacent to the outlet 18 and is tilted upward and downward inside the air vent housing 14, is different from that of FIG. 2A. Unlike that shown in FIG. 2A, only one air guide 140' is formed in the air guide cover 100' of the second embodiment and adjusts a wind exiting the outlet 18 upward and downward. Therefore, to this end, a hinge shaft 110' is not positioned at a center of the air duct 200 but is biased downward. Other components, for example, an edge portion 19 of the outlet 18, a vortex generator 300, the upper and lower garnishes 10 and 12, and the like are similar to those of the first embodiment.

As described above, the present embodiment has a structure in which the air guide 140 is disposed further upward and thus a Coanda effect is fundamentally caused along an upper skin (upper garnish 10) to obtain an upward wind. The Coanda effect for the upward wind and the formation of a vortex according to the present embodiment are similar to those of the embodiment of FIG. 2A, and thus descriptions thereof will be omitted. However, in the present embodiment, the shape of the end surface 141 of the air guide 140 is modified to create a downward wind.

Figure 10:
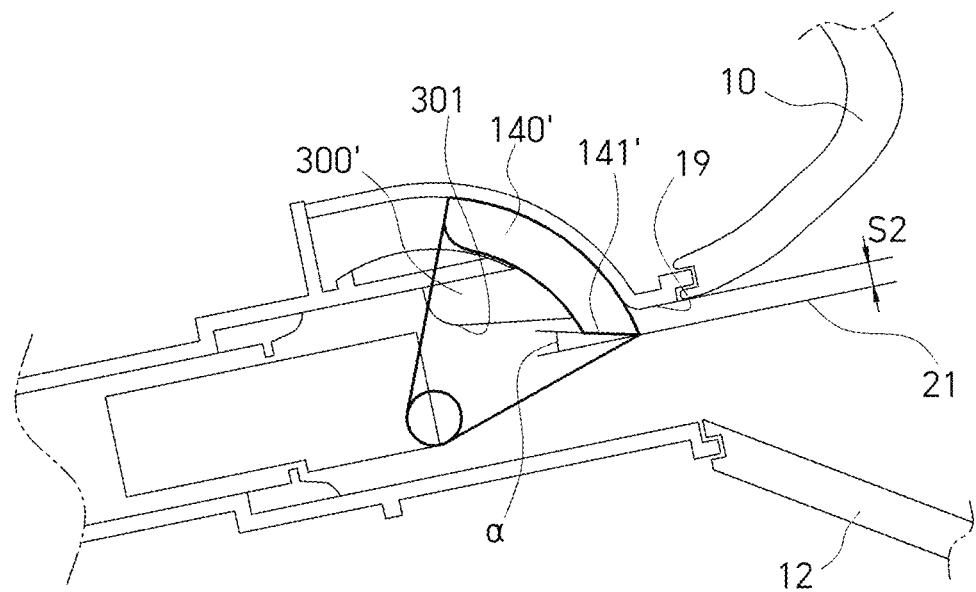
FIG. 10 is a view for describing a shape and a directional angle of an end surface (141') of an air guide (140') of the air ventilation apparatus according to the embodiment of FIG. 9.

The shape and directional angle of an end surface 141' of the air guide 140' in an air ventilation apparatus according to the present embodiment will be described with reference to FIG. 10. It has been described in the embodiment of FIG. 2A that the end surface 141 of the air guide 140 is formed as a surface parallel to a longitudinal axis of the air vent housing 14, but in the present embodiment, as shown in FIG. 10, the end surface 141' of the air guide 140' is formed to have a directional angle of "α" with respect to a longitudinal axis 21 of the air vent housing 14. When the air guide 140' is tilted downward to create a downward wind, the end surface 141' is designed such that a degree to which the end surface 141' protrudes is great. When the air guide 140' is tilted downward due to an increase in protrusion amount and an action of the directional angle α, air is guided to a lower edge portion 19 of the outlet 18, and thus, a Coanda effect at a lower side is caused along the lower garnish 12. That is, instead of including only one air guide 140', the protrusion amount of the end surface 141' of the air guide 140' and an angle (directional angle) toward the lower edge portion 19 are increased.

A distance s2 between an end of the end surface 141' of the air guide 140' and an upper edge portion 19 of the outlet 18, which is required for causing a downward Coanda effect in the present embodiment shown in FIG. 10, that is, the protrusion amount of the end surface 141', may be 7 mm or more. In addition, the directional angle α with respect to the longitudinal axis 21 of the air vent housing may be about 25°. When the directional angle exceeds 25°, the package formation of the air vent housing may become difficult, and there may be a difficulty in adjusting a wind direction. When the directional angle is set to be less than 25°, the occurrence of a Coanda effect on an upper skin may be insufficient.

The present embodiment has the following advantage and disadvantage as compared with the embodiment shown in FIG. 2A. Advantage: the structure of the air ventilation apparatus is simplified, and a vertical width of the air ventilation apparatus is reduced, which is advantageous in ultra-slim implementation. Disadvantage: there may be a difficulty in setting the wind in a normal mode.

Meanwhile, in FIG. 9, the embodiment in which the air guide 141' is positioned at an upper side is illustrated, but the embodiment of FIG. 9 may be modified to a structure vertically symmetric with that of the embodiment of FIG. 9 such that the air guide 141' is structurally positioned at an opposite side, i.e., at a lower side.

Figure 11A:
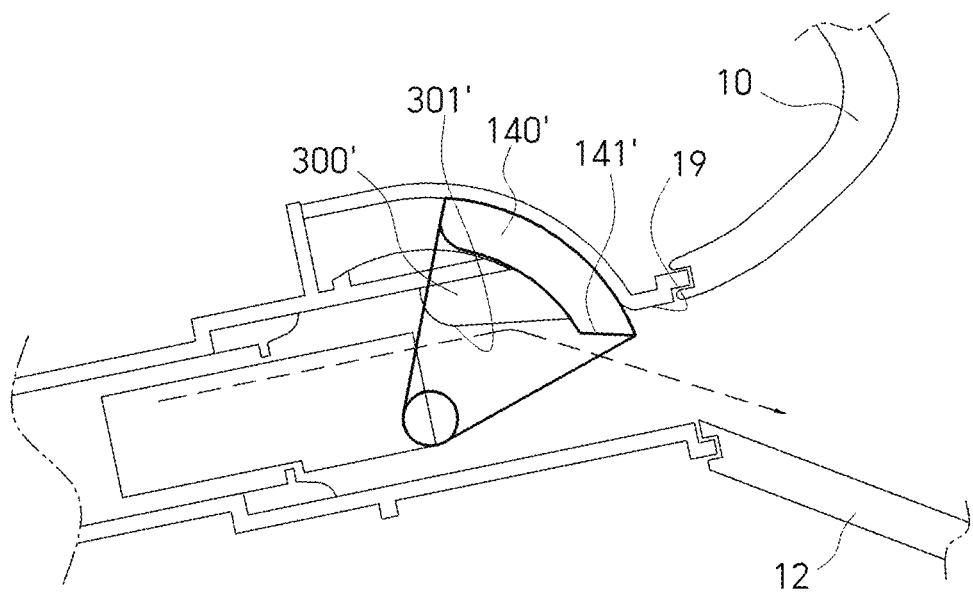
FIGS. 11A, 11B, and 11C are views for describing operations according to operation modes of the embodiment of FIG. 9.
Figure 11A:
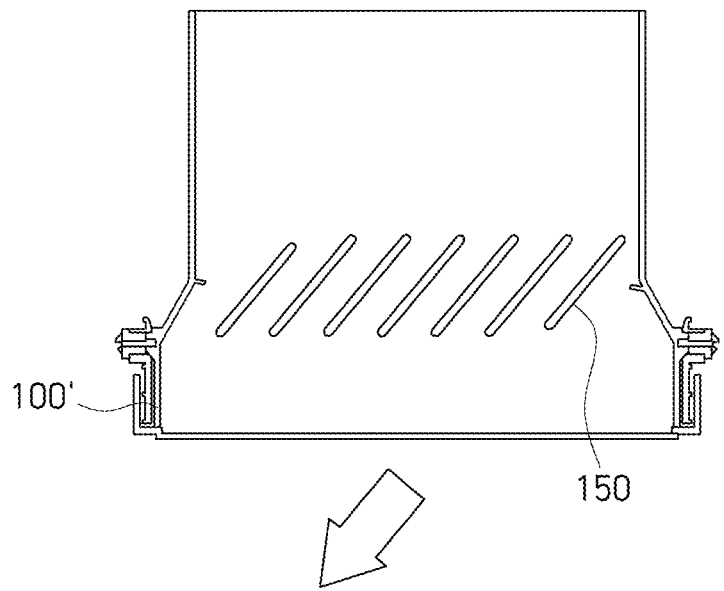
Figure 11B:
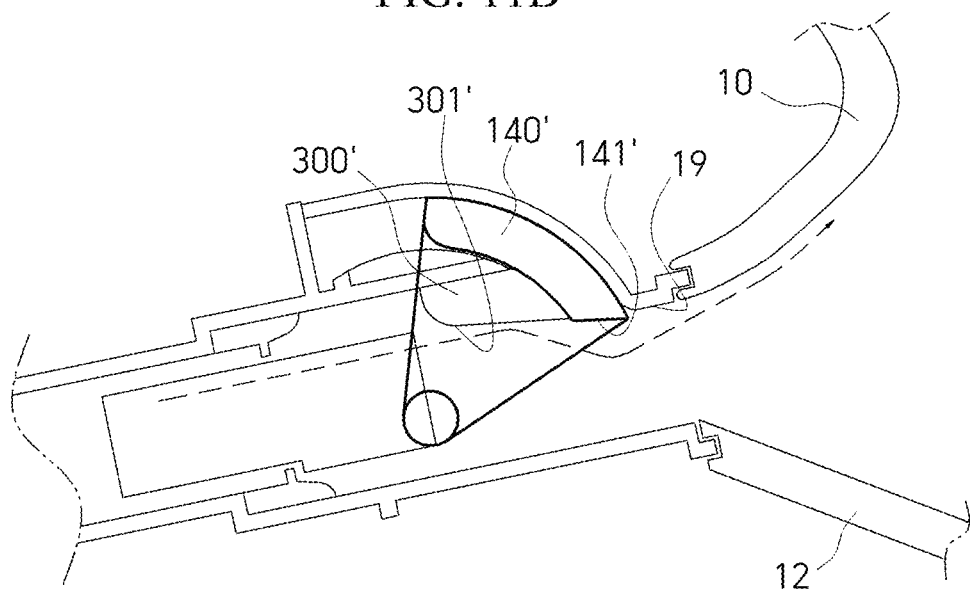
Figure 11B:
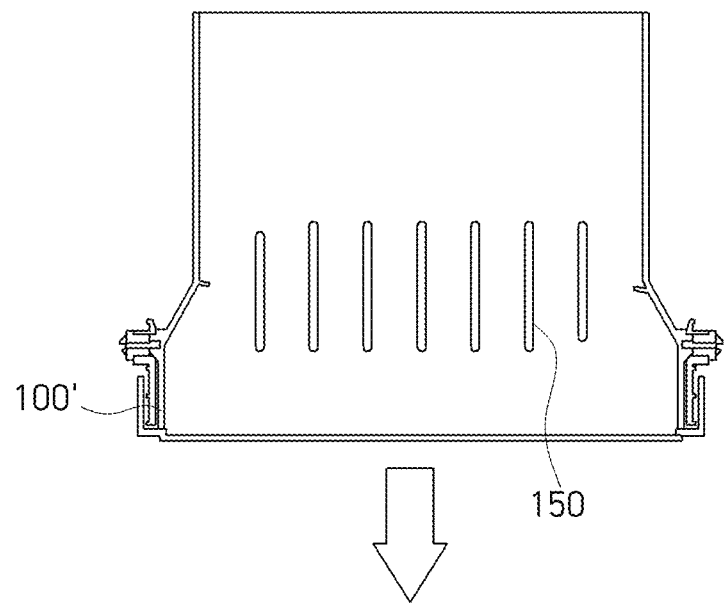
Figure 11C:
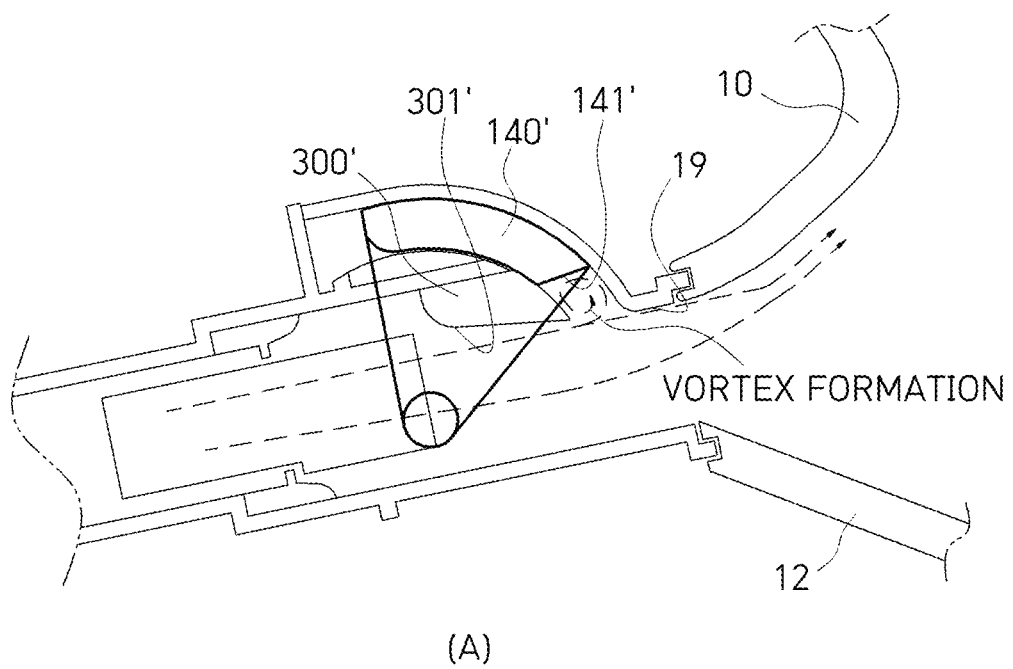
Figure 11C:
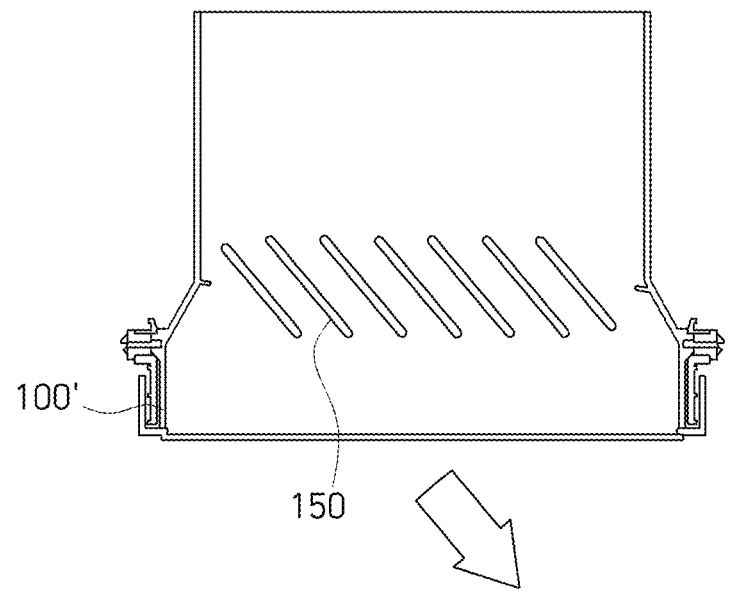

FIGS. 11A, 11B, and 11C are, similar to views shown in FIGS. 6A, 6B, and 6C, views for describing a Coanda effect and an action of a vortex according to operation modes (downward, upward, and normal modes; leftward, normal, and rightward modes) according to the second embodiment.

In the downward mode of FIG. 11A, as in the situation of FIG. 10A, the end surface 141' of the air guide 140' protrudes further downward than the upper edge portion 19, and after a course of a wind is changed below the outlet 18 due to the directional angle (see FIG. 10), a Coanda effect is caused along the lower garnish 12. Thus, the wind is discharged as a downward wind. In the normal mode of FIG. 11B, the air guide 140' is tilted upward, and the end surface 141' is in a state that protrudes slightly further than the upper edge portion 19 of the outlet 18, and thus, a wind is not guided below the outlet 18 downward and is discharged toward a middle of the outlet 18. In addition, in the upward mode of FIG. 11C, the end surface 141' of the air guide 140' retreats further than the upper edge portion 19 and enters into the air vent housing, and thus, a Coanda effect is caused along the upper garnish 10. In addition, a vortex is generated in a space between the end surface 141' entering into the air vent housing, the upper edge portion 19, and an inner surface 301' of the vortex generator 300.

On the other hand, the leftward, normal, and rightward modes shown in the lower drawings of FIGS. 11A, 11B, and 11C are performed by the left and right wind direction adjusting plates 150 in the air guide cover 100 as shown in FIG. 2B. This is the same as the previously described embodiment.

According to the present invention, due to the application of a Coanda effect, pressure of an outlet for air ventilation is minimized, and an internal structure is simplified, thereby facilitating constitution of an ultra-slim air ventilation apparatus which includes an outlet having a vertical width of 15 mm or less.

The configuration of the present invention has been described in detail with reference to the exemplary embodiments of the present invention, but those skilled in the art will understand that the present invention may be implemented in another specific form different from the content disclosed in this specification without changing the technical spirit or an essential feature of the present invention. Thus, it is to be appreciated that embodiments described above are intended to be illustrative in every sense, and not restrictive. The scope of the present invention is represented by the claims to be described below rather than the detailed description, and it is to be interpreted that the scope of the claims and all the changes or modified forms derived from the equivalents thereof are included in the scope of the present invention.

What is claimed is:

1. An air ventilation apparatus using a Coanda effect, which is positioned between an upper garnish and a lower garnish, includes an outlet for discharging air, and operates in an upward mode and a downward mode, the air ventilation apparatus comprising:
   an upper air guide which converts air discharged from the outlet into an upward wind due to the Coanda effect caused along the upper garnish in the upward mode;
   a lower air guide which converts the air discharged from the outlet into a downward wind due to the Coanda effect caused along the lower garnish in the downward mode;
   an air vent housing connected to the upper garnish and the lower garnish;
   an upper vortex generator fixed in the air vent housing and configured to generate a vortex between the outlet and the upper air guide so as to join the upward wind due to the Coanda effect;
   a lower vortex generator fixed in the air vent housing and configured to generate a vortex between the outlet and the lower air guide so as to join the downward wind due to the Coanda effect; and
   a shaft disposed at a center portion between walls of the air vent housing,
   wherein among the upper vortex generator, the lower vortex generator, the upper air guide, and the lower air guide, only the upper air guide and the lower air guide are configured to rotate around the shaft.

2. The air ventilation apparatus of claim 1, wherein the upper air guide comprises an end surface which retracts from the outlet in the upward mode to allow the air discharged from the outlet to be discharged as the upward wind due to the Coanda effect caused along the upper garnish.

3. The air ventilation apparatus of claim 2, wherein the end surface of the upper air guide enters the outlet in the downward mode to suppress the air discharged from the outlet from causing the Coanda effect along the upper garnish.

4. The air ventilation apparatus of claim 1, wherein the lower air guide comprises an end surface which retracts from the outlet in the downward mode to allow the air discharged from the outlet to be discharged as the downward wind due to the Coanda effect caused along the lower garnish.

5. Air ventilation apparatus of claim 4, wherein the end surface of the lower air guide enters the outlet in the upward mode to suppress the air discharged from the outlet from causing the Coanda effect along the lower garnish.

6. The air ventilation apparatus of claim 1, wherein a space, extending between the upper garnish and the lower garnish and extending from a region between the upper air guide and the lower air guide to an exterior of the air ventilation apparatus, includes only air.

7. An air ventilation method using a Coanda effect, operating an air ventilation apparatus in an upward mode and a downward mode, wherein the air ventilation apparatus is positioned between an upper garnish and a lower garnish and comprises an outlet for discharging, an air vent housing connected to the upper garnish and the lower garnish, a shaft disposed at a center portion between walls of the air vent housing, an upper vortex generator fixed in the air vent housing, and a lower vortex generator fixed in the air vent housing, the method comprising:
   converting air discharged from the outlet into an upward wind due to the Coanda effect caused along the upper garnish in the upward mode, by rotating only the upper air guide and the lower air guide, among the upper air guide, the lower air guide, the upper vortex generator, and the lower vortex generator, around the shaft in a first direction;
   joining a vortex between the outlet and the upper air guide, generated by the upper vortex generator, to the upward wind;
   converting the air discharged from the outlet into a downward wind due to the Coanda effect caused along the lower garnish in the downward mode, by rotating only the upper air guide and the lower air guide, among the upper air guide, the lower air guide, the upper vortex generator, and the lower vortex generator, around the shaft in a second direction opposite to the first direction; and
   joining a vortex between the outlet and the lower air guide, generated by the lower vortex generator, to the lower wind.

8. The air ventilation method of claim 7, further comprising:
   suppressing the Coanda effect from being caused along the upper garnish by the air discharged from the outlet in the downward mode; and
   suppressing the Coanda effect from being caused along the lower garnish by the air discharged from the outlet in the upward mode.

9. The air ventilation method of claim 7, further comprising generating a vortex in the air discharged from the outlet in the upward mode due to the Coanda effect.

10. The air ventilation method of claim 7, wherein a space, extending between the upper garnish and the lower garnish and extending from a region between the upper air guide and the lower air guide to an exterior of the air ventilation apparatus, includes only air.

* * * * *